Dec. 10, 1957 P. A. MARSAL 2,816,152
AIR-DEPOLARIZED CELLS.
Filed Jan. 20, 1954

INVENTOR
PAUL A. MARSAL
BY John F. Hohmann
ATTORNEY

United States Patent Office 2,816,152
Patented Dec. 10, 1957

2,816,152

AIR-DEPOLARIZED CELLS

Paul A. Marsal, Rocky River, Ohio, assignor to Union Carbide Corporation, a corporation of New York Application January 20, 1954, Serial No. 405,099

11 Claims. (Cl. 136—106)

This invention relates to primary galvanic cells that are depolarized by atmospheric oxygen, which enters through a porous cathode partially immersed in an immobilized electrolyte.

The utility of such air-depolarized cells, particularly those of the zinc-carbon-alkaline type, has in the past been limited by their size, as hitherto it has not been possible to produce minature cells, which render at least approximately the output of cells of the same size using a manganese dioxide depolarizer. With the development of electronic devices of smaller size, such as the personal hearing aid and portable radio transmitters, there has been an increased demand for the production of primary batteries of small size. The continuing trend is to reduce the size of such batteries still further.

The reason for the inability of small air-depolarized cells to compete successfully with the conventional oxide depolarized cells lies in their construction. In cells of this type, the cathode is usually carried in an opening in the cell cover or casing in such a way that a portion of it is exposed to the air. The joint between the cathode and the cover or casing is usually sealed by means of a filling of thermoplastic material. After being placed in use for some time, the electrolyte may begin to show creepage at the cathode seal interface, wetting the carbon at this point, and loosening, if not breaking, the contact with the seal. In this manner, the electrolyte may creep up the electrode, and escape through the joint between the seal and the cathode, forming incrustations, and in some cases, especially in small size cells, appreciably reducing the depolarizing region of the cell. Further, for the successful operation of air-depolarized cells, the penetration of electrolyte into the cathode must be kept as low as possible, because such penetration reduces the depolarizing ability of this electrode, and consequently, the output of the cell, especially upon relatively heavy drain.

It is the principal object of this invention to provide by means of new structural and chemical arrangements of elements, an improved sub-miniature air-depolarized cell possessing among other advantages and improvements, the following:

A substantially smaller size than the presently commercially available air-depolarized cells.

A greater ratio of current capacity to cell volume.

These and related advantages of this invention are attained as disclosed in the specifications which follow, and wherein reference is made to the drawings in which.

Essentially, this invention comprises an air-depolarized cell having an active cathode, a suitable anode and an immobilize electrolyte encompassed by a substantially leak-proof plastic case.

Figure 1:
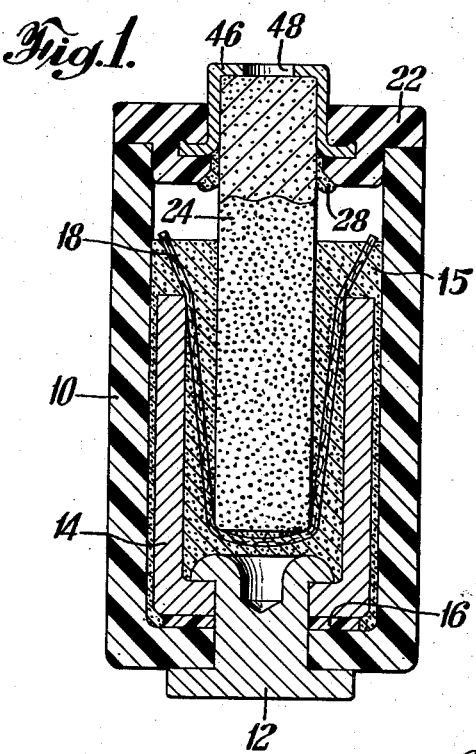
Fig. 1 is a vertical section of a cell embodying the various features of this invention.
Figure 2:
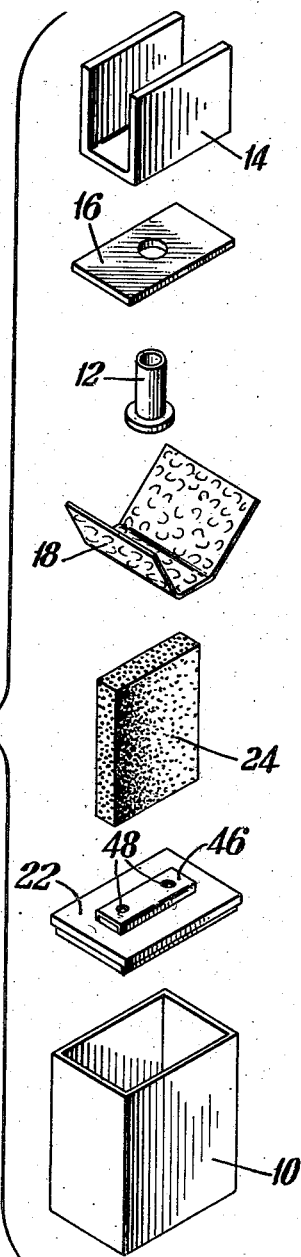
Fig. 2 is an exploded view showing, on an enlarged scale, cell elements.

In the drawings, a preferred typical embodiment of the invention is illustrated in Fig. 1 by a cell comprising a plastic case 10, preferably made of a modified polystyrene composition whose bottom has been hole-punched to permit the insertion of interfitting means; in this case, a standard tubular copper rivet 12, which holds the U-shaped zinc anode against a soft plastic sealing washer or gasket 16 in the bottom of said case. The rivet head, in addition to serving as the anode fastener, also is the external anode connector. A floccose separator pad 18 composed of rayon paper or other similarly treated alkaline-resistant paper is placed between the anode 14 and the cathode 24 to prevent physical contact between them, help support the electrolyte paste structure, thereby minimizing syneresis, and to prevent short circuits by the zinc oxide reaction product which accumulates as the cell is discharged. The complete anode structure including the external connector is below electrolyte paste 15 level, thus avoiding the harmful effects of air corrosion.

The anode may be integrally united with the cell case by molding it in place in the plastic case. By this procedure, the case conforms perfectly to the shape of the anode, eliminating trapped air, and permitting the rivet to be curled over very solidly without danger of cracking the case.

The U-shape construction for the anode results in a more even consumption of the material. Where this material is zinc, it may be amalgamated in any known manner.

The cathode 24 between the legs of the U-shaped anode, which has a portion exposed outside the cell is separated from the case by a plastic cover 22 of the same composition as the cell case; and an inner seal 28 consisting of a self-polymerizing resin is laid in a recess molded in the plastic top between the cathode and the plastic top. A metallic insert 46; in effect, a rectangular cathode connector, permitting polarity discrimination by contrast with the rounded anodic connector, and having one or more apertures 48, is fitted over the protruded portion of the cathode. Specifically, these openings provide a means of access for oxygen from the ambient air into the interior of the cell. The oxygen of the air is occluded by the carbon cathode, and is thereafter used to perform its depolarization function at the carbon cathode-electrolyte interface. As the total cross section of the apertures determines the air flow into the cell, and consequently its electrical output, the capacity of the cell may be controlled by providing it with perforations of different sizes and numbers. In this manner, therefore, cells of this type may be constructed for either low or high current drain service.

In the preferred embodiment of this invention, the active cathode is composed of finely divided carbonaceous particles, integrally united with a thermoplastic resin constituting a substantially continuous matrix. Such a cathode may be fabricated, for example, by compression molding under pressure of about 5,000 pounds per square inch, and a temperature of around 400° F., a mixture comprising carbonaceous particles and up to 30% by weight of a suitable thermoplastic resin. In this construction advantage may be taken of the selective oxygen transmission and electrolyte-repellent properties of resins such as polyethylene and the like. Where greater electrolyte-seepage prevention is desired, suitable electrolyte-proofing or water-proofing materials may be applied in any conventional manner to the surfaces of the cathode exposed to the electrolyte.

A preferred electrolyte composition for use in this invention is disclosed and claimed in U. S. Patent 2,597,117 by E. A. Schumacher and P. S. Brooks. Said electrolyte contains zinc oxide and sodium hydroxide in aqueous solution; the relative proportions being about one part of zinc oxide and 3½ parts of sodium hydroxide to 11 parts by weight of water. This electrolytic solution is stabilized or immobilized by the addition of starch to an amount approximately equal to ⅓ of the solution weight. Sufficient electrolyte 15 is introduced into the container so as to fill the intervening space between the cathode 24 and the separator pad 18, while also completely covering the internal anode connective surfaces, and thereby avoiding air corrosion problems. After sealing the assembly is kept at about 90° F. by induction heating, and centrifuged to bring the paste to the bottom.

Efficient sealing between the plastic top 22 and the case 10 is provided by fusing the two surfaces with a suitable solvent such as ethyl acetate or an equivalent solution. Thus leakage of the electrolyte through the top of the cell is eliminated. The possibility of electrolyte leak through the carbon electrode is substantially reduced by virtue of its thermoplastic-bound construction. Further, the use of a modified polystyrene case and cover greatly improves creepage and leakage characteristics, since caustic soda solutions do not wet or creep on a polystyrene surface.

For use in hearing aids, a cell ¼" x ⅜" x ½" occupying 40% less volume than an equivalent mercuric oxide cell was constructed following the method of this invention. Its power was found sufficient to operate for 100 hours new transistor-type hearing aids on a drain of 2.5 milliamperes under a relatively constant average voltage of 1.07 volts at 70° F.

Figure 3:
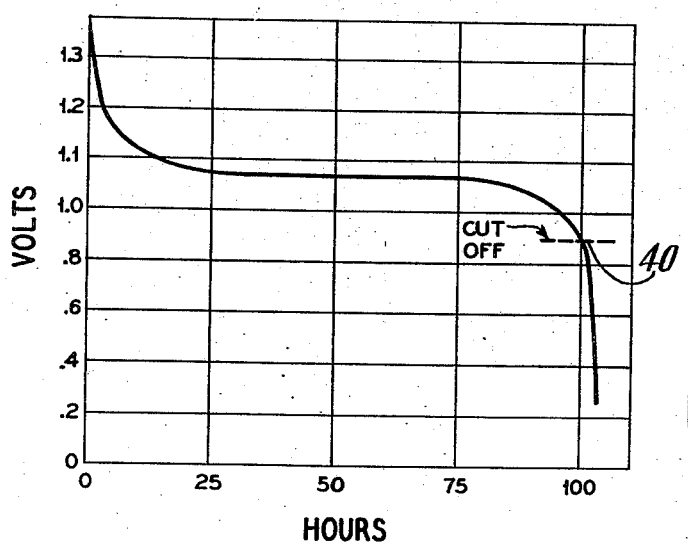
Fig. 3 is a graph representing a typical voltage curve for this cell.

The graph of Fig. 3 illustrates a typical voltage curve for this cell. It will be noticed here that the cell has a substantially flat voltage discharge curve, as well as a high ratio of current output over the cut-off voltage 40.

Again with a view to using this cell in hearing aid equipment, it will be noted that the cell of this invention offers distinct advantages if a rectangular configuration is used, especially in cases where two or three cells are to be used in series or in parallel. A calculated 36 different arrangements can be made in a battery-operated instrument involving two such cells, and a calculated 216 arrangements can be made with three cells of this type, whereas round cells can only be positioned in the instrument in two or three different ways.

For further polarity discrimination, in addition to the contour differences in the terminal connectors, the top and bottom members of the cell case may be molded of differently colored plastics, thereby eliminating the possibility of placing cells with reverse polarity in battery-operated equipment.

By the present invention, an improved miniature air-depolarized cell is provided, having, among other advantages, that of being superior over presently employed cells of this type in that it provides a higher radio of current capacity to cell volume.

I claim:

1. An air-depolarized cell including a rectangular outer case, a U-shaped anode bent to conform with the shape of three sides of said case while allowing space intermediate its extremities for the positioning of an active cathode depending from the cover of said case, having a portion exposed outside said cell, and immobilized electrolyte completely covering said anode to exclude all air therefrom; a floccose separator pad between said anode and cathode; a pair of electrical contactors respectively holding said anode and cathode in assembled relation inside and communicating outside said case; one of said contactors providing means for the ingress of ambient air into the depolarizing region of the cell.

2. An air-depolarized cell including a rectangular outer case, a U-shaped anode integrally united with the cell case, said anode conforming in shape with the contour of three sides of said case and having space intermediate the extremities thereof for an active cathode, having a portion exposed outside said cell, an immobilized electrolyte therebetween completely surrounding said anode to exclude air therefrom; a floccose separator pad between said anode and cathode; a pair of electrical contactors respectively holding said anode and cathode in assembled relation inside and communicating outside said case; one of said contactors providing means for the ingress of ambient air into the depolarizing region of the cell.

3. In an air-depolarized cell, an outer rectangular case composed of electrolyte-repellent material, a cover therefor; an anode and cathode; said anode conformably disposed inside said casing parallel to three sides thereof, the extremities of said anode being spaced apart to provide space for said cathode; a gasket separating said anode and casing and in contact therewith; supporting means having a portion thereof disposed outside said casing and in contact with said anode simultaneously holding said gasket and anode in assembled relation; outer contact means, making electrical contact with said cathode, and provided with apertures to facilitate the passage of ambient air into the cell; an aqueous electrolyte immobilized between said electrodes completely covering said anode and a floccose separator pad between said anode and said cathode.

4. An alkaline, air-depolarized cell comprising, in combination, a U-shaped anode in a rectangular polystyrene case; a cover fitting on the case and sealed thereto; interfitting means for said anode making electrical contact therewith; an air permeable active cathode interposed between the legs of the aforesaid anode; said cathode depending from, and sealed, to the cell top, and provided with a metal contactor having a plurality of apertures therein to allow passage of ambient air to the cell; an alkaline electrolyte immobilized between said anode and cathode completely covering said anode and a floccose separator pad between said anode and said cathode.

5. An air-depolarized cell comprising an outer rectangular case, a rectangular, U-shaped pronged anode and an active cathode having a portion exposed outside said cell positioned intermediate the prongs of said cathode, an electrolyte containing zinc oxide and sodium hydroxide in aqueous solution, and so disposed as to cover the internal anode connective surfaces thereby avoiding air corrosion; a floccose separator pad between said anode and said active cathode; a pair of electrical contactors respectively holding said anode and cathode in assembled relation inside and communicating outside said cell case; one of said contactors providing means for the entry of ambient air into the depolarizing region of the cell.

6. An air-depolarized cell comprising an outer rectangular case, a U-shaped zinc anode, an active carbon cathode disposed between the legs of said anode and having a portion exposed outside said cell, an electrolyte containing zinc oxide and sodium hydroxide in aqueous solution, and so disposed as to cover the internal anode connective surfaces, thereby avoiding air corrosion; a floccose separator pad between said zinc anode and said carbon cathode; a pair of electrical contactors respectively holding said anode and cathode in assembled relation inside and communicating outside said cell case; one of said contactors providing means for the entry of ambient air into the depolarizing region of the cell.

7. An air-depolarized cell comprising a rectangular polystyrene case; a cover therefor; a U-shaped zinc anode integrally united with said case and separated from the bottom of this case by a plastic gasket; a tubular rivet serving as an external connector for, and simultaneously holding, said anode and gasket in predetermined position in the cell case; an active cathode interposed between the legs of the aforesaid anode, said cathode being sealed to the cell cover and having contact means provided with apertures allowing the entry of ambient air into the cell; an alkaline electrolyte immobilized between the cell anode and cathode covering said anode and a floccose separator pad between said anode and cathode.

8. An air-depolarized cell comprising a rectangular polystyrene case; a cover therefor; a U-shaped zinc anode integrally united with said case and separated from the bottom of this case by a plastic gasket; a tubular rivet serving as an external connector for, and simultaneously holding, said anode and gasket in predetermined position in the cell case; an active carbon cathode composed of finely divided carbonaceous particles integrally united with a thermoplastic resin and interposed between the legs of the aforesaid anode said cathode being sealed to the cell cover and having contact means provided with apertures allowing the entry of ambient air into the cell; an aqueous alkaline electrolyte containing zinc oxide and sodium hydroxide immobilized between the cell anode and cathode completely covering said anode and a floccose separator pad between said anode and cathode.

9. An air-depolarized cell comprising a rectangular polystyrene case to cover a U-shaped zinc anode integrally united with said case and separated from the bottom of this case by a plastic gasket, a tubular rivet serving as an external connector for, and simultaneously holding, said anode and gasket in predetermined position in the cell case; an active cathode interposed between the legs of the aforesaid anode, said cathode being sealed to the cell cover and having contact means provided with apertures to allow the entry of ambient air into the cell, said cathode being protected by suitable water proofing material against seepage by an alkaline electrolyte immobilized between the cell anode and cathode completely covering said anode and a floccose separator pad between said anode and cathode.

10. An air-depolarized cell comprising a plastic case, differently colored top and bottom members therefor, permitting polarity discrimination; a U-shaped zinc anode separated from the bottom member of this case by a soft plastic gasket; a tubular rivet serving as an external connector for, and simultaneously holding, said anode and gasket in pre-determined position in the cell case; an active cathode interposed between the legs of the aforesaid anode, said cathode being sealed to the cell cover and having contact means provided with apertures allowing the entry of ambient air into the cell; an aqueous alkaline electrolyte containing zinc oxide and sodium hydroxide immobilized between the cell anode and cathode completely covering said anode and a floccose separator pad between said anode and cathode.

11. An air-depolarized cell comprising a rectangular plastic case, differently colored top and bottom plastic members therefor, permitting polarity discrimination; a U-shaped zinc anode integrally united with said case and separated from the bottom member of this case by a soft plastic gasket, a tubular copper rivet serving as an external connector for, and simultaneously holding, said anode and gasket in predetermined position in the cell case; an active carbon cathode composed of finely divided carbonaceous particles integrally united with a thermoplastic resin and interposed between the legs of the aforesaid anode, said cathode being sealed to the cell cover and having metallic contact means provided with apertures allowing the entry of ambient air into the cell; an aqueous alkaline electrolyte containing sodium hydroxide and zinc oxide immobilized between the cell anode and cathode, said electrolyte being present to such a level in said cell that the entire anode structure including said external connector is below electrolyte level, and a floccose separator pad between said anode and cathode.

References Cited in the file of this patent

UNITED STATES PATENTS

| | | |
|---|---|---|
| 1,039,949 | Jaeger et al. | Oct. 1, 1912 |
| 1,899,615 | Heise | Feb. 28, 1933 |
| 2,233,593 | Eddy et al. | Mar. 4, 1941 |
| 2,544,115 | Wagner | Mar. 6, 1951 |
| 2,572,918 | Fisher et al. | Oct. 30, 1951 |
| 2,597,116 | Marsal et al. | May 20, 1952 |
| 2,597,119 | Schumacher et al. | May 20, 1952 |
| 2,751,428 | Depoix | June 19, 1956 |